United States Patent
Boettcher et al.

(10) Patent No.: US 11,239,012 B2
(45) Date of Patent: *Feb. 1, 2022

(54) PROCESS FOR PRODUCING GRAIN-ORIENTED ELECTRICAL STEEL STRIP

(71) Applicant: SMS Group GmbH, Duesseldorf (DE)

(72) Inventors: Andreas Boettcher, Duisburg (DE); Christian Klinkenberg, Herdecke (DE); Ingo Schuster, Willich (DE)

( * ) Notice: Subject to any disclaimer, the term of this patent is extended or adjusted under 35 U.S.C. 154(b) by 233 days.

This patent is subject to a terminal disclaimer.

(21) Appl. No.: 14/638,338

(22) Filed: Mar. 4, 2015

(65) Prior Publication Data

US 2016/0111190 A1    Apr. 21, 2016

Related U.S. Application Data

(63) Continuation-in-part of application No. 14/514,620, filed on Oct. 15, 2014, now abandoned.

(51) Int. Cl.
| | |
|---|---|
| *C21D 1/42* | (2006.01) |
| *H01F 1/147* | (2006.01) |
| *C21D 8/12* | (2006.01) |
| *C21D 3/04* | (2006.01) |
| *C21D 6/00* | (2006.01) |
| *C21D 9/52* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/16* | (2006.01) |
| *C23C 8/02* | (2006.01) |
| *C23C 8/26* | (2006.01) |
| *H01F 41/02* | (2006.01) |

(52) U.S. Cl.
CPC ........... *H01F 1/14766* (2013.01); *C21D 1/42* (2013.01); *C21D 3/04* (2013.01); *C21D 6/005* (2013.01); *C21D 6/008* (2013.01); *C21D 8/1244* (2013.01); *C21D 8/1255* (2013.01); *C21D 8/1272* (2013.01); *C21D 9/52* (2013.01); *C22C 38/001* (2013.01); *C22C 38/008* (2013.01); *C22C 38/02* (2013.01); *C22C 38/04* (2013.01); *C22C 38/06* (2013.01); *C22C 38/16* (2013.01); *C23C 8/02* (2013.01); *C23C 8/26* (2013.01); *H01F 41/02* (2013.01); *C21D 8/1205* (2013.01); *C21D 8/1222* (2013.01); *C21D 8/1233* (2013.01); *C21D 8/1283* (2013.01); *Y02P 10/25* (2015.11)

(58) Field of Classification Search
CPC .................................................. H01F 1/14766
See application file for complete search history.

(56) References Cited

U.S. PATENT DOCUMENTS

| | | | |
|---|---|---|---|
| 6,331,215 B1 * | 12/2001 | Toge | C21D 8/1233 148/111 |
| 6,488,784 B1 | 12/2002 | Fortunati | |
| 6,524,400 B1 | 2/2003 | Pircher | |
| 8,038,806 B2 | 10/2011 | Guenter | |
| 8,202,374 B2 | 6/2012 | Kumano | |
| 8,277,573 B2 | 10/2012 | Abbruzzese | |
| 8,871,035 B2 | 10/2014 | Fortunati | |
| 2012/0222777 A1 * | 9/2012 | Fortunati | B22D 11/001 148/208 |
| 2012/0285584 A1 | 11/2012 | Wang | |
| 2015/0155085 A1 | 6/2015 | Gabor | |

FOREIGN PATENT DOCUMENTS

| | | |
|---|---|---|
| CN | 103667881 | 3/2014 |
| CN | 103668005 | 3/2014 |
| DE | 102012224531 | 1/2014 |
| JP | 0387315 | 4/1991 |
| JP | 04183818 | 6/1992 |
| JP | 06173019 | 6/1994 |
| JP | 06269901 | 9/1994 |
| JP | 07126754 | 5/1995 |
| JP | 07268471 | 10/1995 |
| JP | 1150150 | 2/1999 |
| JP | 11335737 | 12/1999 |
| RU | 2407809 | 12/2010 |
| WO | 2008129490 | 10/2008 |

OTHER PUBLICATIONS

Abdurahman et al., Induction heating in hot rolling mills, heat processing (Mar. 2012), pp. 71-74.*

(Continued)

*Primary Examiner* — Jophy S. Koshy
(74) *Attorney, Agent, or Firm* — Abelman, Frayne & Schwab; Stefan Knirr

(57) ABSTRACT

A process for producing grain-oriented electrical steel strip by means of thin slab continuous casting and which includes continuously casting the smelt by thin slab continuous casting, subjecting the thin slabs to homogenization annealing at a maximum temperature of 1250° C. and heating to a temperature between 1350° C. and 1380° C., and continuously hot rolling the thin slabs to form a hot-rolled strip, with cooling and reeling the hot-rolled strip to form a coil and cold rolling the hot-rolled strip to a nominal thickness, with subjecting the cold-rolled strip to recrystallization, decarburization and nitridation annealing, which includes a decarburization annealing phase and a subsequent nitridation annealing phase, with an intermediate reduction annealing phase being interposed between the decarburization annealing phase and the nitridation annealing phase, whereby a cold-rolled strip is obtained, which primary recrystallized grains have a circle equivalent mean size (diameter) between 22 µm and 25 µm.

10 Claims, No Drawings

(56) References Cited

OTHER PUBLICATIONS

Rad-Con Inc., What is Bell Annealing?, Dec. 2005, Rev. 1, pp. 1-3, Retrieved from https://www.rad-con.com/annealing_basics.html. (Year: 2010).*

* cited by examiner

PROCESS FOR PRODUCING GRAIN-ORIENTED ELECTRICAL STEEL STRIP

RELATED APPLICATIONS

This application is a continuation-in-part application of U.S. application Ser. No. 14/514,620 filed Oct. 15, 2014.

BACKGROUND OF THE INVENTION

1. Field of the Invention

The invention is directed to a process for producing grain-oriented electrical steel strip by means of thin slab continuous casting, said process comprising the process steps of:
a) smelting a steel with a smelt which, particularly after secondary metallurgical treatment, contains, in addition to iron (Fe) and unavoidable impurities, Si: 2.50-4.00 wt %, C: 0.030-0.100 wt %, Mn: 0.160-0.300 wt %, Cu: 0.100-0.300 wt %, Al: 0.020-0.040 wt %, Sn: 0.050-0.150 wt %, S: <100 ppm, N: <100 ppm, and one or more elements from the group comprising Cr, V, Ni, Mo and Nb,
b) continuously casting the smelt by thin slab continuous casting without exposure of the strand to inert gas to form a strand having a thickness of 50-120 mm, and dividing the strand into thin slabs,
c) carrying out a homogenization annealing comprising the steps of c') heating up the thin slabs, preferably in a linear furnace, to a temperature above 1050° C. and subjecting the slabs to an annealing at a maximum temperature of 1250° C., preferably a maximum temperature of 1200° C., in particular, a maximum temperature of 1150° C., and
d) feeding the thin slabs to an inductive heating device, particularly a high frequency inductive heating device, in which the thin slabs, particularly while passing are directly before the first hot rolling pass, at least for some seconds heated up to a temperature above the previous homogenization temperature of step c'), which temperature is within the temperature range of 1350° C.-1380° C., especially of 1355° C.-1370° C., and is particularly 1360° C.,
e) continuously hot rolling the thin slabs in a preferably linear, multiple-stand hot rolling train to form a hot-rolled strip having a thickness of 1.8 mm-3.0 mm,
f) cooling and reeling the hot-rolled strip at a reeling temperature below 650° C. to form a coil,
g) annealing the hot steel strip after reeling and prior to subsequent cold rolling, at a temperature of between 920° C. and 1150° C.,
h) cold rolling the hot steel strip, preferably on a reversible stand, in a single process step in more than three passes, to a cold-rolled strip having a final thickness of 0.15 mm-0.40 mm,
i) subjecting the cold-rolled strip to recrystallization, decarburization and nitridation annealing,
j) applying an annealing separator (non-stick layer) containing primarily MgO to the strip surface of the cold-rolled strip which has undergone recrystallization, decarburization and nitridation annealing,
k) subjecting the cold-rolled strip which has been coated with the annealing separator to secondary recrystallization annealing by high-temperature annealing in a bell-type furnace, at a temperature of >1150° C., forming a finished steel strip having a pronounced Goss texture, and
l) coating the finished steel strip which has undergone secondary recrystallization annealing with an electrically insulating layer, and then stress-free annealing or stress-relief annealing the coated finished steel strip.

The invention is further directed to a grain-oriented electrical steel strip that is obtained by said process.

2. Description of the Prior Art

The grain-oriented electrical steel strip produced by said process is intended for use in transformers. The material of the grain-oriented electrical steel strip is characterized by a particularly sharp {110}<001> texture (Miller indices), which has a easy magnetization direction parallel to the rolling direction. A method for forming such a texture was first described by N. P. Goss, and therefore, such textures are generally referred to as "Goss texture". The Goss texture is formed by selective, anomalous grain growth, also referred to as secondary recrystallization. In this process, the normal, natural tendency of a metallic matrix toward grain enlargement is suppressed by the presence of grain growth inhibitors, also referred to as inhibitors or an inhibitor phase. An inhibitor phase consists of very fine and optimally homogeneously distributed particles of one or more second phases. These particles have a natural interfacial energy on their boundary surface with the matrix, which inhibits the movement of a grain boundary beyond said boundary surface because the further savings of interfacial energy is minimized throughout the system. Such an inhibitor phase is of central significance to the development of the Goss texture and therefore to the magnetic properties that can be achieved in such a material. It is critical in this process to achieve a homogeneous distribution of a very large number of very small particles, which is more advantageous than a small number of coarser particles. Since the number of precipitated particles cannot be determined through experimentation, their size is used as an indication of their efficacy. It is thus assumed that the particles of the inhibitor phase should not be substantially larger than 100 nm, on average.

In U.S. Pat. No. 1,965,559 A, N. P. Goss describes a process in which a grain-oriented electrical steel strip (silicon steel) is produced by heating up a steel strip, subjecting said strip to a first cold rolling step, and then subjecting the strip to further heat treatment followed by a second cold rolling step.

Also known in practice are processes in which manganese (II) sulfite (MnS) is used as the inhibitor. The slabs produced by block casting or continuous casting are heated to very high temperatures, close to 1400° C., in order to bring primary, coarse MnS precipitates back into solution. This diluted MnS is then precipitated finely dispersed during the hot working process. Since the hot-rolled strip thus produced already has the necessary grain growth inhibition this is referred to as inherent inhibition.

However, the grain growth inhibiting effect of the MnS phase is limited, so that, assuming customary hot-rolled strip thicknesses of, e.g., 2.30 mm, at least two cold rolling stages are required to bring the steel strip to its nominal usable thickness, with an intermediate recrystallization annealing being performed between the individual cold rolling stages. Moreover, material that is inhibited by manganese(II) sulfite can achieve only a limited texture sharpness, in which the Goss position is scattered on average 7° around the ideal position. This texture sharpness is reflected, in the magnetic polarization at a field strength of 800 A/m, which is only rarely able to exceed values of 1.86 T. Such material is traditionally referred to as Conventional Grain Oriented or CGO.

The traditional production process, proceeding from the hot-rolled strip, further comprises a two-stage cold working process in which an intermediate, continuous recrystallization annealing step is performed between the two stages. Prior to the first cold rolling stage, a continuous hot strip annealing step is optionally performed, and is frequently combined with the essential hot strip pickling. The last cold working step is traditionally followed by a continuous recrystallization annealing step. This annealing step also removes the carbon from the steel strip below the magnetic aging limit, which is determined by the maximum carbon content that is soluble in ferrite, or approximately 30 ppm C in a composition of Fe with 3 wt % Si. (Carbon is essential because it establishes the correct microstructure during hot rolling.) The recrystallized microstructure of the steel strip that has been reduced to its nominal usable thickness represents the starting basis for the subsequent step of secondary recrystallization. This secondary recrystallization is accomplished by high temperature annealing in a bell-type furnace. Before the coiled rings (coils) are placed in the bell-type annealing furnace, the surface of the steel strip must be provided with a non-stick layer. An aqueous slurry of magnesium oxide (MgO) is usually used for this purpose. Once the magnetically desirable Goss texture has formed during the high temperature annealing in a bell-type furnace, the outer shape of the steel strip is further improved, and an electrically insulating layer is applied to the two opposing, large-area, wide surfaces of the strip. This is carried out in a continuous annealing furnace.

SU 688527 A1 discloses a production process which likewise involves a two-stage cold rolling process with a continuous recrystallization strip annealing step between the two stages. However, during this intermediate annealing stage, the strip is also simultaneously decarburized. This has the advantage that, after the final cold rolling to the nominal usable thickness, no further continuous strip annealing step is required. The strip is simply coated with the non-stick layer (usually MgO) and then fed directly to a high-temperature bell-type annealing furnace. However, the microstructure of the resulting strip is not recrystallized, but is instead as-rolled. As a result, during the very gradual heating of the steel strip during annealing in a bell-type furnace, a microstructural recovery is first achieved, followed by a primary recrystallization, and then secondary grain growth, which causes the formation of the Goss texture. This process offers the advantages of relatively cost-effective and reliable production. However, it carries with it the disadvantage that it can achieve magnetic values only at the level of CGO material, and not those of High permeability Grain Oriented or HGO material.

In U.S. Pat. No. 3,159,511 A, Taguchi describes a process for producing grain-oriented electrical steel strip by which improved texture sharpness can be achieved, with scattering of only approximately 3° around the ideal position. This is achieved by the additional utilization of aluminum nitride (AlN) as the inhibitor phase, the grain-growth inhibiting effect of which supplements that of MnS. This allows a single-stage cold rolling process to be used. The material obtained in this manner is referred to as High permeability Grain Oriented or HGO. The AlN inhibitors are precipitated into the ferritic microstructural regions in their final state during hot rolling. However, increasing the carbon (C) content somewhat over that of CGO material allows the AlN particles, which are located in the austenitic microstructural regions in the subsequent hot rolled strip annealing, to be dissolved out again and then precipitated very finely dispersed in a highly controlled manner. This can be performed at industrially readily achievable temperatures in a continuous annealing line, since the solubility temperature of AlN in austenite of 1080° C. to 1140° C. is much lower than in ferrite. Despite this double formation of the AlN inhibitor phase (both in ferrite during hot rolling and in austenite during continuous hot strip annealing), this is referred to as inherent inhibition since it is produced in the hot strip and the grain growth-inhibiting foreign phase particles are fully present at the start of the "cold process".

DE 2 351 141 A1 proposes the use of SbSe as a further inherent inhibitor phase.

All of the aforementioned inherent inhibitors that are produced in the hot strip require very high slab reheating temperatures greater than 1350° C. In addition to requiring substantial energy input and high industrial expenditure, these temperatures result in a high occurrence of liquid slag (>1%) due to a relatively low-melting Fe—Si eutectic mixture. In addition to the resulting substantial losses in mass yield, industrial annealing systems are heavily stressed, further adding to cost. Therefore, so-called low heating processes are also used, in which the slab reheating temperatures are reduced to less than 1350° C., ideally less than 1250° C. A temperature around 1250° C. is interesting because it allows hot-rolled strip for grain-oriented electrical steel to be produced together with conventional flat-rolled steel. However, in these processes the inhibitor phase cannot be formed in the hot-rolled strip because the substances used as inhibitor particles cannot be dissolved out sufficiently at these temperatures to allow them to be re-precipitated finely dispersed in the subsequent process.

EP 0 619 376 A1 discloses a low heating process in which low slab reheating temperatures can be achieved with traditional inherent inhibition. In this process, only copper(Cu) sulfide, which has a substantially lower solubility temperature than MnS or AlN or other known inhibitors, is used as inhibitor, with a drastic reduction in the slab preheating temperature.

The magnetic characteristics that can be achieved in an electrical steel strip by this process are generally between those of CGO and HGO material.

With the low heating process, the inhibitors are not formed until a later stage in the overall production process. The material used in this process particularly contains sufficient free unbonded Aluminum (Al). By various methods of nitridation, the AlN inhibitor phase is formed in the steel strip, which has been cold rolled to its nominal usable thickness. This form of inhibitor phase is not inherently present in the hot-rolled strip, and is instead first acquired during a later step of the cold-rolled strip treatment process. Such a process involving acquired inhibition is described in EP 0 219 611 B1.

EP 0 648 847 B1 and EP 0 947 597 B1 describe mixed forms of inherent and acquired inhibition, in which the slab preheating temperatures are set at values above those of low heating methods, but below the threshold beyond which deleterious liquid slag forms. Inherent inhibition can thereby be formed only to a limited extent, and alone would not be sufficient to produce satisfactory magnetic characteristics in the finished material/finished strip. However, this disadvantage can be overcome by combining this process with nitridation treatment, because the resulting additional acquired inhibition is enough to achieve sufficient total inhibition.

In the process involving acquired inhibition, for industrial reasons only AlN is used as an inhibitor in practical applications, because only nitrogen as an interstitial element has a sufficiently high diffusion speed in the matrix. Sulfides are not used as acquired inhibitor phases, because sulfur can penetrate into the matrix only via vacancy diffusion, which would be far too slow, even with thermal activation.

In nitridation, nitrogen is injected from the outside through the strip surface into the matrix, causing AlN particles to form there. This must occur over the entire strip cross-section up to the center of the strip, so that the matrix will remain uniformly stabilized until the subsequent secondary recrystallization. During nitridation, ammonia gas ($NH_3$) is added to the annealing atmosphere during continuous annealing treatment.

The above-described processes relate to conventional slab technology with slab thicknesses significantly greater than 150 mm, typically 210 mm-260 mm Another important development in the history of grain-oriented electrical steel strip is the use of so-called thin slab technology, as described in EP 1 025 268 B1. The main economic advantage of this technology is that thin slabs, which are understood to be (cast) slabs having a thickness of 50 to 120 mm, typically 60 mm-90 mm, are no longer cooled to the ambient temperature and later reheated to high temperatures, but are instead fed at a controlled temperature to a linear homogenization furnace, in which they need only to be (re)heated somewhat in order to compensate for temperature losses, and to homogenize their temperature over the length and width of the strip Immediately thereafter, these thin slabs are then hot rolled. In practical use, this results in substantial cost advantages due to the savings of energy, and an improved hot-rolled strip edge condition, with the resulting yield improvement (improvement of physical yield).

Due to the limited thermal resistance of the thin slabs and the need to transport them through a roller hearth furnace, the temperature that can be reached by heating is limited by the thickness of the slab. For example, with a slab thickness of 65 mm for a typical grain-oriented Si steel, 1200° C. is the critical upper limit for ensuring sufficient practical production reliability. For this reason, process routes that are based on thin slab technology, i.e., thin slab continuous casting, are all essentially low-heating methods. Such processes, in which only the use of acquired inhibitors by nitridation treatment is considered, are described in U.S. Pat. No. 8,038,806 B2 and in U.S. Pat. No. 8,088,229 B2.

As compared with the hot processing method of casting thick slabs followed by a two-stage hot rolling process consisting of hot rough rolling (roughing) and hot finish rolling (finishing), the above-described thin slab technology or thin slab casting/rolling technology based on thin slab continuous casting has the particular feature that it comprises only one hot working step similar to hot finish rolling. It has been found, however, that separating the process into quasi-hot roughing and finishing is expedient, since a period of 10-30 seconds for recrystallizing the microstructure is beneficial to the homogeneity of the hot strip and therefore also to the homogeneity of the final characteristics of the finished product, as is disclosed by WO 2011/063934 A1.

One prior art, which discloses the fundamental and essential process steps of producing grain-oriented electrical steel strip by means of thin slab continuous casting is described by EP 1 025 268 B1 and EP 1 752 548 A1.

Producing grain-oriented electrical steel strip by means of thin slab continuous casting followed by homogenization annealing and hot rolling in line, cold-rolling the strip to its nominal usable thickness, and later nitridation annealing the strip to introduce an acquired grain growth inhibitor phase still results in practice in fluctuations in the ultimate magnetic characteristics across the length and width of the finished strip, and as a consequence, a decrease in the quality of the finished strip.

U.S. Pat. No. 6,432,222 B1 discloses a method for producing grain oriented electrical steel wherein a homogenization annealing is carried out at a temperature of up to 1350° C.

The object of the invention is therefore to devise a process that will enable the cost-efficient production of high-grade grain-oriented electrical steel using thin slab continuous casting systems, and in particular, to devise a solution that will provide a further improved process for producing grain-oriented electrical steel strip by means of thin slab continuous casting.

SUMMARY OF THE INVENTION

In a process of the type described in the introductory part, the object of the invention is attained in that the recrystallization, decarburization and nitridation annealing of the cold-rolled strip in process step i)

comprises a decarburization annealing phase which is carried out at a strip temperature ranging from 820° C.-890° C. for a maximum period of 150 seconds, using a gaseous annealing atmosphere, in particular moist, which contains nitrogen ($N_2$) and hydrogen ($H_2$) and acts on the cold-rolled strip, and which has a water vapor/hydrogen partial pressure ratio $pH_2O/pH_2$ of 0.30 to 0.60, and comprises a subsequent nitridation annealing phase, which is carried out at a temperature ranging from 850° C.-920° C. for a maximum period of 50 seconds, using a gaseous annealing atmosphere which contains nitrogen ($N_2$) and hydrogen ($H_2$) and acts on the cold-rolled strip, and which has a water vapor/hydrogen partial pressure ratio $pH_2O/pH_2$ of 0.03 to 0.07, and an intermediate reduction annealing phase, which is carried out between the decarburization annealing phase and the nitridation annealing phase, and is carried out at a temperature ranging from 820° C.-890° C. for a maximum period of 40 seconds, using a gaseous annealing atmosphere, in particular dry, which contains nitrogen ($N_2$) and hydrogen ($H_2$) and acts on the cold-rolled strip, and which has a water vapor/hydrogen partial pressure ratio $pH_2O/pH_2$ of less than 0.10 and wherein a cold rolled strip is obtained, which primary recrystallized grains have a circle equivalent mean size (diameter) between 22 µm and 25 µm.

For a grain-oriented electrical steel strip according to the invention, the object of the invention is attained in that the grain-oriented electrical steel strip is obtained by above-mentioned process.

The process steps of the process according to the invention can be carried out in a system that performs each of the individual process steps continuously online, but may also be carried out by first performing individual process steps or a group of individual process steps, and then performing the remaining process steps offline in a separate system.

According to the invention, therefore, particular emphasis is placed on the procedural, process engineering design of the process step of decarburization and nitridation annealing of the cold-rolled strip, and in this connection particularly on the process-stable formation of the gas-surface reaction.

This process of nitridation is a highly sensitive and failure-prone surface-gas reaction.

The problem with nitridation is that, prior to this step, decarburization annealing is carried out under necessarily highly oxidative (moist) gas conditions, whereas nitridation is carried out in a drier annealing atmosphere with lower potential for oxidation. The highly oxidative decarburization annealing can therefore form variously compact or locally inhomogeneous oxidative barrier layers that will interfere with the subsequent nitridation. To combat this problem, it is proposed according to the invention to insert an intermediate reduction annealing phase (intermediate reduction zone) in order to correct any local superoxidation that have formed during the immediately preceding decarburization annealing phase, so that the nitridation treatment to follow directly can be performed homogeneously and reproducibly. This intermediate reduction annealing phase is carried out under the same annealing atmosphere as the decarburization annealing immediately preceding it, but at a reduced water vapor/hydrogen partial pressure ratio of $pH_2O/pH_2<0.10$, or ideally <0.05. The intermediate reduction annealing phase lasts a maximum of 40 seconds, preferably 10 to 20 seconds. The temperature ranges from 820-890° C. and should ideally be approximately centered between the optimized and selected temperature levels at which the preceding decarburization annealing and the subsequent nitridation annealing will be performed. This facilitates the process in process step i) in terms of systems.

As a result of the inserted intermediate reduction treatment, a satisfactory, homogeneous and reproducible formation of the AlN inhibitor phase in the annealed cold-rolled strip is achieved. This allows measures to be provided by which, in addition to the inhibition acquired during nitridation annealing of the cold-rolled strip, an inherent inhibition can also be carried out or initiated. For this purpose the invention provides that immediately before the first hot-rolling of step e), in a previous step d) directly before the first hot rolling pass the thin slabs are fed to an induction heating device, in particular, a high-frequency induction heating device, in which the thin slabs are heated at least for several seconds, particularly in the production flow path, to a temperature of 1350° C.-1380° C., which is above the respective (homogenization) temperature of process step c').

For grain-oriented electrical steel strip, this results in further options in terms of process engineering, which leads to improvements in magnetic product characteristics and the homogenization thereof. In principle, although the maximum through-heating temperature for thin slabs is technically limited due to the limited high temperature strength of these formats, so that in principle, only an acquired inhibition should be feasible, with the option proposed here of heating the thin slab material for several seconds to temperatures of up to 1380° C., an inherent (partial) inhibition based on MnS and AlN can additionally be achieved. The unavoidably low high temperature strength of the material at such high temperatures is non-problematic, since the technical configuration of the material conveyance system can be designed and implemented such that each of the slabs that are heated to such a temperature is picked up and transported from the first stand of the hot working stage or the hot-rolling line. The general problem of liquid slag formation on the thin slab surface does not arise here as the temperatures between 1350° C. and 1380° C. will be reached only for a short time of a few seconds. But these few seconds are sufficient for obtaining the dissolution of inhibitor particles.

The inherent inhibition that can be achieved thereby is not sufficient to provide the total inhibition being necessary for an overall process comprising a single cold-rolling stage, and therefore, an acquired inhibition must still be provided by nitridation annealing, which, as is known from the prior art, is achieved by nitriding the strip that has been cold-rolled to its usable thickness. However, the significant advantage is that the inherent partial inhibition that is formed during hot-rolling stabilizes the microstructure of the strip for its passage through the additional process steps, and prevents any parasitic grain growth processes.

During the primary-recrystallizing, decarburizing and nitriding annealing process neither texture relations nor oxygen contents are controlled. In fact values referring to the texture ratio or the oxygen content are regulated due to the respective controlling of the respective plant, device or process. It exists no monitoring or controlling system which governs or controls the texture ration or the oxygen content. The cold-rolled strip obtained as primary recrystallized grains have a circle equivalent mean size (diameter) between 22 μm to 25 μm. The expression "casting without exposure of the strand to inert-gas" means a casting without exposure the resulting strand to an inert-gas exposure, wherein a customary and usual protection of the metal stream poured out into the tundish or into the mold may nevertheless exist.

In the embodiment of the invention, the process of nitridation, which comprises the highly sensitive and susceptible surface-gas reaction, is further positively influenced by adding at least 2 vol. % to a maximum of 12 vol. % ammonia ($NH_3$), in particular, referred to the total gas flow rate, separately to the annealing atmosphere during the nitridation annealing phase in process step i), and by blowing the ammonia onto the two opposing, large-area strip surfaces of the cold-rolled strip. This results in an improvement of the production process and the technical process at this point, since the cold ammonia ($NH_3$) is blown onto the heated strip as a constituent of the annealing gas, where it decays directly and immediately on the strip surface to nitrogen, hydrogen and water vapor according to the reaction equation $NH_3 \rightarrow N++\frac{1}{2} H_2+H_2$.

Since the nitridation allows a nitrogen content to be established in the annealed strip, it is advantageous according to a further embodiment of the invention that, during the annealing in process step i), which comprises the decarburization annealing phase, the intermediate reduction annealing phase, and the nitridation annealing phase, the cold-rolled strip is annealed such that after annealing, the cold-rolled strip has a total nitrogen content of at least 200 ppm, preferably at least 280 ppm, in particular, at least 400 ppm.

It is further advantageous for the cold-rolled strip to be heated at the start of recrystallization annealing in process step i) at a heating rate of more than 100 K/s, which is likewise proposed by the invention.

In a particularly expedient alloy composition for the smelt to be cast in the embodiment of the invention, in the smelt in process step a) the ratio of manganese (Mn) to sulfur (S) is greater than 6, preferably greater than 20, and the ratio of aluminum (Al) to nitrogen (N) is greater than 4, preferably greater than 10.

It is further expedient according to the invention for the superheating temperature of the smelt during casting in process step b) to be less than 40K, preferably less than 20 K, in particular, less than 12 K, and for the reduction in thickness of the strand to be implemented according to the "Liquid Core Reduction" method just below the metal mold while the core inside the strand is still liquid.

Advantageously, the hot rolling in process step e) is carried out at an initial rolling temperature during the first working pass of greater than 1150° C., preferably greater than 1200° C., a final rolling temperature ranging from 850° C.-980° C., and a final rolling speed of less than 12 m/s, preferably less than 10 m/s, which is likewise proposed by the invention.

In a further embodiment, the invention is characterized in that, during annealing of the hot-rolled strip in process step g), the annealed hot-rolled strip is quenched after annealing at a cooling rate of more than 25 K/s, preferably more than 30 K/s, in particular, more than 40 K/s, particularly preferably a cooling rate ranging from 25 K/s-52 K/s.

It is further expedient in the embodiment of the invention for the working during cold-rolling in process step h) to be carried out such that, during at least one or more of the last three passes, the hot-rolled strip reaches a temperature, generated by the processing heat during rolling, of at least 180° C. to a maximum of 260° C., for at least five minutes.

The cold rolling in process step h) can also be carried out in two stages, therefore the invention further proposes that the cold rolling in process step g) be carried out in two stages, wherein the hot-rolled strip is pickled in a pickling step prior to the first cold-rolling stage, and once the first stage of cold rolling has been completed, the hot-rolled strip is annealed according to process step g). In this case, it is then further advantageous for the thickness of the hot-rolled strip to be reduced by cold rolling by at least 85% in the second stage of cold rolling.

An annealing atmosphere that is advantageous for secondary recrystallization annealing can be achieved according to the invention by carrying out the secondary recrystallization annealing in process step k) such that during the heating phase of the high-temperature annealing in a bell-type furnace, the percentage of nitrogen ($N_2$) in the gaseous annealing atmosphere, in terms of atomic percent, is greater than the percentage of hydrogen ($H_2$), in terms of atomic percent.

Finally, the invention also provides that, following process step l), in particular optionally, a process step is performed which effects a magnetic domain refinement of the coated finished steel strip.

Overall, the invention is based on a basic alloy system that is customarily used for grain-oriented electrical steel strip and comprises iron at a proportion of 2 to 6.5 wt % and Si, typically a Si content of 3.2 wt %. Other suitable alloy elements are carbon, manganese, copper and aluminum, along with sulfur and nitrogen. The contents of manganese within the range of 0.160 to 0.300 wt %. The sulfur content is set below 100 ppm and preferably below 50 ppm. The smelt is cast to form a strand using a thin slab casting machine without exposure of the strand to inert gas. This strand is then divided into thin slabs, and these thin slabs are subjected to homogenization annealing in a continuous furnace at a temperature greater than 1050° C., preferably at 1150° C. The thin slabs are then heated up rapidly to a temperature above 1350° C. and up to 1380° C. using an in line induction heating apparatus, and immediately thereafter, the thin slabs are hot worked to a hot strip thickness ranging from 1.8 mm-3.0 mm, preferably from 1.80-2.30 mm. Once the hot-rolled strip produced in this manner has been pickled and annealed, it is cold rolled to its nominal usable thickness ranging from 0.15 mm-0.50 mm, preferably ranging from 0.23 mm-0.40 mm, wherein the processing heat, having a temperature range of 180° C. to 260° C., is allowed to act on the strip for at least 5 minutes, preferably 6 minutes. The cold-rolled strip thus produced is then recrystallized, decarburized and nitrided in a continuous annealing line, during which the nitrogen content is increased to at least 180 ppm. Between the partial steps of decarburization and nitridation, an intermediate reduction phase is implemented to adjust the oxidic surface layer. During the primary recrystalization, decarburization, and nitridation annealing, the texture ratios and the oxygen content are again not controlled. Rather, these values are adjusted automatically by control of the respective system and process. There is not any control or regulating system for controlling the texture ratios or oxygen content.

DETAILED DESCRIPTION OF PREFERRED EMBODIMENTS

A cold-rolled strip will be obtained which primary recrystallized grains have a circle equivalent mean size (diameter) between 22 μm and 25 μm.

After a non-stick coating (annealing separator), particularly consisting of MgO, is applied, the material is subjected to high-temperature annealing in a bell-type annealing furnace, at a temperature above 1150° C. and up to 1200° C., for the purpose of adjusting and forming the magnetically required Goss texture. An insulating coating is then applied, which is followed immediately by continuous stress-relief annealing. Following inspection, certification and adjustment, the result is a grain-oriented electrical steel strip in the form of a finished strip ready for use. During carrying out the process, during the secondary recrystallization the texture ratios and the oxygen content are again not controlled. Rather, these values are adjusted automatically by control of the respective system and process. There is not any control or regulating system for controlling the texture ratios or oxygen content.

The chemical composition of the smelt for casting is stated for the following reasons:

Silicon causes an increase in specific electric resistivity and therefore a decrease in the classic magnetic losses. Below an alloying degree of 2 wt %, its use as grain-oriented electrical steel does not make sense. An alloying percentage above 4 wt % impedes processing tremendously due to the massive brittleness that results. In practical applications, Si alloying percentages of 3.15 to 3.30 wt % have proven advantageous. Beyond even 3.45 wt %, the aforementioned problems with brittleness are observed.

During high temperature processes carbon causes structural homogenization as a result of ferrite-austenite transformation. Carbon contents of between 0.030 and 0.100 wt %, preferably 0.045-0.065 wt %, are generally standard. This effect is intensified with high C contents; however, the decarburization step that is necessary during this process then requires more time, thereby reducing productivity.

The alloy element manganese generally has a favorable effect on casting and hot working properties. Moreover, a certain Mn content is helpful in reducing wear and tear on refractory material during the liquid metallurgical treatment steps. Mn contents ranging from 0.160-0.300 wt % have proven advantageous in practice, wherein according to the invention Mn-content is within the range >0.15% by weight, in particular in the range from 0.16-0.3% by weight.

In the process considered here, sulfur is more of a detractive element and is decreased to contents of less than 100 ppm. The sulfur content should preferably be less than 40 ppm. During solidification of the smelt, MnS particles form, which are retained in the very coarse state in which they are precipitated during solidification of the smelt throughout the entire process, and are magnetically deleterious in the finished product. However, reducing the S content will result in the formation of only a small number of coarse MnS particles, which do not have a deleterious effect. It is further known that the ratio of manganese to sulfur is correlative to the quality of the hot-rolled strip edges in terms of the occurrence of edge crack. This ratio should therefore be at least Mn/S >6, more preferably >20.

In the overall alloy considered here, tin is present elementally and segregated at boundary surfaces. The presence of Sn in a concentration of up to 0.150 wt %, but ideally in a range of 0.060-0.100 wt %, has a beneficial effect on the process of secondary recrystallization. An additional permanent slight impedance of grain boundary movement results overall in sharper selection and therefore in greater texture sharpness in the finished material. However, increased Sn contents can impair the adhesion of the insulating layer applied at the end of the production process.

Copper is an element that in most cases becomes a steel admixture through the addition of scrap metal. Copper is known to segregate at boundary surfaces, and can therefore prevent the above-described damaging secondary effects of tin. For this reason, at least as much copper should be present in the alloy as tin, but ideally the ratio of copper (Cu) to tin (Sn) should be equal to 2. Copper also forms Cu precipitations (Cu clusters), which likewise contribute to grain growth inhibition. In practice, Cu contents of up to 0.300 wt % exhibit no disadvantages, with the ideal Cu content ranging from 0.150 to 0.250 wt %.

Aluminum is the main carrier of grain growth inhibition, and is based on the acid soluble proportion of the aluminum. (The remainder is alumina Al2O3). To adjust the effect of the inhibitor phase correctly, the Al content should be between 0.020 and 0.040 wt %, ideally between 0.026 and 0.031 wt %.

Nitrogen, together with the acid soluble aluminum, acts as an inhibitor by way of the finely dispersed precipitation of AlN particles. Nitrogen is supplied to the strip in two ways: via an unavoidable proportion existing in the composition of the smelt, and via the nitriding process during annealing of the cold-rolled strip. In order to have as much free aluminum as bonded AlN (in number of atoms) available for the nitriding process, the N content of the smelt cannot exceed 25% of the Al content, but should range from 50 to 90 ppm and therefore below 100 ppm.

In addition to iron and unavoidable impurities, additional alloy elements, such as chromium, molybdenum, vanadium, nickel and others, may also be contained. Oxygen and boron contents must definitely be adjusted to values of less than 5 ppm. (Oxygen forms oxides, which as particles diminish the magnetic properties. Boron produces extreme brittleness and must be avoided wherever possible.)

The method and manner of smelt production, e.g., the type and frequency of secondary metallurgical treatments, is not important as long as the desired alloy constituents can be prepared with reproducible precision. In particular, the secondary metallurgical treatment of the smelt should be such that the addition of calcium to improve pourability is highly limited. This is because calcium causes precipitations which must be avoided in principle for magnetic reasons.

The smelt is cast to form a strand at a maximum superheating temperature of 40 K, ideally less than 20 K, and optimally less than 12 K, in each case referred to the liquidus temperature, which for the steel alloy considered here is very close to 1493° C. Casting at a temperature just above the liquidus point will result in an advantageously homogeneous solidification structure with a high globulitic primary microstructure ratio. However, with all of the above, production reliability must take priority, in which too great a decrease in the superheating temperature is associated with the risk of premature solidification. The strand is cast without exposure to inert gas, and conventional and usual protection is provided during casting the strand in the tundish and the mold.

The Liquid Core Reduction (LCR) casting method is also used, i.e., casting is carried out into a metal mold having a thickness of 80-120 mm, for example, after which the strand, which has not yet fully solidified and still has a liquid core, is reduced by adjusting the segments, preferably the first two segments, to a lower thickness range of between 50 and 120 mm, preferably 50-90 mm, in particular, 65-85 mm. In this manner, the more critical conditions which can occur during thin slab continuous casting as compared with the previously customary thick slab continuous casting are mitigated. Furthermore, this method facilitates casting at a lower superheating temperature. The vertical, rectilinear arrangement used during continuous casting over the entire metallurgical length is advantageous for ensuring a high degree of metallurgical cleanliness. The fully solidified strand is bent to the horizontal position at temperatures above 1100° C., which has a favorable impact on the homogeneity of the inner microstructure.

The resulting strand is separated into individual thin slabs by cross-cutting, and is through-heated homogeneously in a compensating furnace to a maximum temperature of 1250° C., but at least to a temperature that will allow the softened thin slab to be further worked in a reliable process. The time required for through-heating can be between 15 and 60 minutes.

Before the thin slab, which has undergone a first homogenization annealing step in the continuous furnace, is hot rolled, it passes within a second homogenization step through a high-frequency induction heating device, which is situated immediately upstream of the hot working line and in which the thin slab is heated up to a temperature between 1300° C. and 1380° C., preferably between 1355° C. and 1370° C., particularly up to 1360° C. This inductor is ideally designed to be capable of raising the temperature of a thin slab measuring 60-90 mm in thickness, for example, and typically 1000-1300 mm in width by 150-300 K as it is being advanced lengthwise into the hot working line at a typical infeed rate of less than 1 m/s. The structure of the induction device is designed with respect to its electrical specifications (particularly frequency) such that uniform through-heating (skin depth) up to the core can be achieved.

An induction heating device of this type offers several technical advantages:

For one, this technical option gives the hot working process substantial thermomechanical degrees of freedom and therefore enormous flexibility in designing the hot working/temperature/time process.

For another, it offers the technical option of selecting the compensation temperature for the thin slabs as advantageously low, for example, around 1150° C., so that the thin slabs can thereafter be heated individually to any desired initial hot rolling temperature, up to approximately 1380° C. In addition to the tremendous gain in logistical flexibility in production, this allows a substantial savings of energy in the large compensating furnace. It is also possible to optimize the technology for the roller hearth of the compensating furnace. For example, at an appropriate, constant compensating temperature that is not overly high, water-cooled furnace rollers can be dispensed with, and in their place, simpler, uncooled rollers can be used. Substantial amounts of energy are saved as a result, since no thermal energy must be discharged to the exterior unused due to the water cooling of the rollers.

For grain-oriented electrical steel strip, there is a further option in terms of process engineering, which will result in improvements in magnetic product characteristics and the homogenization thereof. As stated above, the maximum through-heating temperature for thin slabs is technically limited due to the limited high temperature strength of these formats. As a result, only acquired inhibition can be achieved. Now, with this new option of heating the thin slab material to temperatures up to 1380° C. for several seconds, an inherent partial inhibition based on MnS and AlN can be achieved. The unavoidably low high temperature strength at such high temperatures is non-problematic in this case, since the technical configuration of the material conveyance system can be designed such that each of the slabs is picked up and transported from the first stand of the hot working stage. The inherent inhibition that can be produced in this manner is not sufficient to provide the total inhibition required in terms of the complete single cold-rolling process. Therefore, acquired inhibition must also be added, which is produced by nitriding the strip which has been cold rolled to its usable thickness. But the main advantage over the prior art is that, due to the inherent partial inhibition formed during hot rolling, the microstructure of the strip, which is stabilized on its processing path, which comprises hot-rolled strip annealing prior to cold rolling, and recrystallization, decarburization and nitridation annealing of the strip that has been cold-rolled to its usable thickness, prevents any parasitic grain growth.

Immediately after the inductive heating of the thin slab, the slab is hot rolled in the linear hot rolling stage to a hot strip thickness ranging from 1.80 to 3.0 mm, preferably from 1.8 mm to 2.5 mm. Based on the overall temperature curve, the initial rolling temperature is generally substantially higher than 1200° C. This ensures that full recrystallization of the hot worked cast structure will take place after the first, and at the latest after the second hot working pass. The high initial rolling temperature likewise ensures maintenance of a safe final rolling speed at the required high final rolling temperatures of generally >950° C. In the present case, the maximum speed at which the steel strip can be safely transported to reeling is 12 m/s. By selecting the proper final temperature of the thin slab following induction heating, the actual speeds can be reduced to 7.5 m/s, thereby decreasing the risk of roller breaks and increasing yield as a result.

The hot rolled steel strip is subjected to hot rolled strip annealing, which is carried out for 180-300 seconds, typically 240 seconds, at temperatures of 950-1150° C. Particularly important in hot rolled strip annealing is the rapid quenching of the steel strip that has just been annealed, at a cooling rate of >30 K/s, preferably >40 K/s, and particularly >45 K/s, ordinarily by means of water-injection nozzles at high water pressure. For one thing, hot rolled strip annealing fulfills the function of microstructure homogenization. However, the regions of the hot rolled strip close to the surface, in which the Goss texture is already present due to the shear ratios during hot working, are made somewhat more coarse, which is advantageous in principle for the formation of the Goss texture in the subsequent cold rolling process. Moreover, the rapid cooling causes a finely dispersed carbide precipitation. In the subsequent cold rolling process, this leads to intensified strain-hardening and therefore to energy being introduced into the matrix. Immediately after water quenching, the surface of the hot-rolled strip is freed of the annealing scale by customary descaling and pickling techniques.

The hot-rolled strip annealing is followed by cold rolling, which involves a single step of rolling to the finished strip thickness; however, this step is carried out in several successive passes. The standard nominal thicknesses for grain-oriented electrical steel strip are 0.35 mm, 0.30 mm, 0.27 mm, 0.23 mm and 0.18 mm. In this process, cold rolling must be performed such that the processing heat from cold work that is introduced into the strip during the final 3 passes will act on the strip for long enough (at least 5 minutes) for the dissolved carbon content to settle in the dislocations which are heavily induced during plastic deformation, resulting in a further increase in deformation energy in the microstructure when cold rolling continues (known as the "Cottrell effect"). Although with conventional deep-drawn steels, for example, the Cottrell effect is undesirable, for grain-oriented electrical steel strip it is necessary in order to obtain the most fine-grained and homogeneous microstructure following recrystallization, which also provides the best conditions for magnetic characteristics. Ideally, such conditions are provided on a reversible stand. The dimensions of this processing heat must be properly controlled during production. This refers the so-called "aging temperature". This temperature can be controlled by regularly placing a contact thermometer on the edge of the strip after each rolling pass, or can be electronically detected continuously during cold rolling using technical devices or equipment appropriate for this purpose. This temperature must be within a range of 180° C.-260° C., at least between one of the last 3 cold-rolling passes, and is typically 220° C. If a temperature of 180° C. is not achieved for a protracted period, the above-described aging effect will be insufficient, and fluctuations in magnetic quality will result. However, if this temperature reaches levels above 260° C., oxide layers may form on the surface ("bluing"), which can lead to inhomogeneous gas reactions in the subsequent decarburization and nitridation annealing.

The cold-rolled strip must be recrystallized in order to give it the proper crystallographic texture from which the secondary recrystallization can be optimally achieved. In principle, it is advantageous here to choose the highest possible heating rate in order to minimize the portion of recovery of the cold-rolled microstructure that occurs prior to recrystallization. Normal heating rates of 20-40 K/s, such as are possible in a conventional continuous annealing furnace equipped with gas-fired jet burners, are sufficient for this. However, it is advantageous to increase the heating rate to levels of several 100 K/s using an inductive or other type of rapid heating apparatus, for example. Recrystallization continuous annealing is known in the art.

Finally, the strip must be decarburized, with the carbon being reduced to residual levels of less than 30 ppm. This is important to prevent any carbide from forming in the finished product, which would allow the magnetization losses to increase dramatically (magnetic aging). 30 ppm is the upper solubility limit for carbon in the ferritic matrix in the alloy being considered here, with approximately 3 wt % (2.5-4 wt %) silicon. Decarburization is carried out simultaneously with recrystallization. The temperature of this annealing ranges from 820 to 890° C., ideally 840-850° C., in which the strip surface-gas reaction is most effective. Based on initial carbon content and strip thickness, annealing times of various lengths are required for decarburization, with a maximum time of 150 seconds, but typically of less than 100 seconds. For the desired decarburizing strip surface-gas reaction, a moist annealing atmosphere containing hydrogen, nitrogen and water vapor is required. These constituents may be varied within wide limits, as long as the oxidation potential remains suitably adjusted. This is the case when the partial pressure ratio of water vapor to hydrogen $pH_2O/pH_2$ is within a range of 0.30 to 0.60, preferably between 0.35 and 0.46.

The recrystallized and decarburized cold-rolled strip is then nitrided, in order to form the acquired inhibitor phase. This can be carried out at various temperatures ranging from 850 to 920° C., wherein a maximum action time of 50 seconds, generally 15-40 seconds, in particular, typically approximately 30 seconds should be used. In this case, the annealing atmosphere comprises a mixture of hydrogen, nitrogen, water vapor and ammonia, in which a partial pressure ratio $pH_2O/pH_2$ ranging from 0.02 to 0.08, in particular, 0.03-0.07, is established. The proportion of gaseous ammonia $NH_3$ in the total gas volume can range from at least 2 vol. % to a maximum of 12 vol. %. These proportions are based on the detailed structural conditions in the nitriding part, for example, the technical design of the infeed tuyere stocks, the distance thereof from the strip, and the infeed pressure, and must therefore be individually optimized based on the object in question. Nitriding in general is a multi-stage process. During the partial annealing treatment described thus far, the nitrogen has been first injected into a layer very near the surface, so that the total nitrogen content in the strip at this point is at least 200 ppm, preferably at least 400 ppm. In the initial phase of the subsequent high-temperature annealing in a bell-type furnace, which is used to perform secondary recrystallization, the nitrogen is spread by diffusion over the entire strip thickness and combines with the aluminum present there locally to form AlN particles, which complete the already existing inherent partial inhibition.

This process of nitridation is a highly sensitive and failure-prone surface-gas reaction, which can, in principle, lead to an inhomogeneous configuration. One problem with this process is that preceding it, the decarburization annealing is necessarily performed under heavily oxidative (moist) gas conditions, whereas nitridation is optimally carried out in a drier annealing atmosphere with lower potential for oxidation. The highly oxidative decarburization annealing can therefore form variously compact or locally inhomogeneous oxidative barrier layers that will impede the subsequent nitridation. To combat this problem, an intermediate reduction annealing phase (intermediate reduction zone) is interposed, in order to correct any local superoxidation that may have formed during the immediately preceding decarburization annealing, so that the nitridation treatment to follow directly can be performed homogeneously and reproducibly. This intermediate reduction annealing phase should therefore be carried out under the same annealing atmosphere as the decarburization annealing immediately preceding it, but at a reduced partial pressure ratio $pH_2O/pH_2$ of <0.10, or ideally <0.05. The intermediate reduction annealing phase lasts a maximum of 40 seconds, preferably 10 to 20 seconds. The temperature ranges from 820-890° C. and should ideally be approximately centered between the optimized and selected temperature levels for decarburization nitridation treatment, which will simplify the process in terms of systems engineering.

At the primary recrystalization, decarburization, and nitridation annealing, neither texture ratios nor oxygen content are controlled. Rather, the related values are determined automatically by control of respective system and process. There is not any central and/or regulating system for controlling the texture ratios or the oxygen content. A cold-rolled strip is obtained, which primary recrystallized grains have a circle equivalent mean size (diameter) between 22 μm and 25 μm.

The steel strip that has been recrystallized, decarburized and nitrided in this manner is then coated with a non-stick layer (annealing separator), before it can be further processed, wound to form a coil, by high-temperature annealing in a bell-type furnace. The non-stick coating is applied to the steel strip as an aqueous slurry of MgO powder in demineralized water. Here, it is important to minimize the pick-up of crystal water in the MgO, for which purpose measures such as minimizing the period of contact between the MgO and the water, cooling the entire MgO slurry and coating system and the cold-rolled strip itself to 4° C., and rapidly drying the coating offer possible options.

The formation of the Goss texture by the process of secondary grain growth is carried out by means of traditional high-temperature annealing in a bell-type furnace. The coils, which have been coated with a non-stick layer, are placed on highly heat-resistant steel plates through which the annealing gas is directed, and are encompassed by protective hoods. The heating hoods are then placed over these, and are either fired with gas or electrically heated. Once the entire annealing assembly has been flushed with dry nitrogen gas at the start of each annealing pass, a rapid heating to 400° C. is performed, followed by slow heating at approximately 15-20 K/h, up to a holding temperature of 1190-1210° C. In this process, an intermediate holding stage lasting 5 to 10 hours can advantageously be introduced, at a temperature ranging from 600-700° C., particularly at 650° C., which serves to compensate for temperature gradients of heavy and thermally sluggish coils. During this slow heating phase, the protective hoods are supplied with a mixture of dry nitrogen and hydrogen. Dry annealing gas is particularly important in this case, because any water vapor fractions will disrupt the sensitive process of texture formation. However, a certain increase in humidity is unavoidable beyond a temperature of 400° C., as a result of evaporating crystal water, which is unavoidable in small quantities, from the MgO non-stick layer. That is why it is so important to minimize the pick-up of crystal water by the above-described measures.

With respect to the composition of the annealing gas during the heating phase, an annealing atmosphere having a strongly predominant nitrogen proportion of up to 90 vol. % $N_2$ is used. Such an excess of nitrogen allows the period of action of the AlN inhibitor phase to be extended somewhat, because the decomposition of AlN and the removal of the released nitrogen are delayed somewhat.

Once the holding temperature is reached, the gas supply is switched to 100% hydrogen, and is maintained for at least 20 hours at 1190-1210° C. To optimize the holding time and the holding temperature, the total purification of sulfur and nitrogen must be ensured, and the formation of edge defects on the stand edge of the coils (bottom buckles) must be minimized.

When this high-temperature holding time has expired, the resulting finished steel strip is cooled to ambient temperature. During this process, feeding with 100% hydrogen gas is initially maintained, in order to avoid any nitrogen pick-up. However, as soon as the temperature in the coils drops below approximately 600° C., the annealing atmosphere is switched to 100% dry nitrogen. As soon as the temperature drops below 400° C., the heating hoods can be raised, and when it drops below approximately 100° C. the protective hoods can also be raised.

Following the high-temperature annealing in a bell-type furnace, the secondary recrystallized finished steel strip is mechanically cleaned of excess residual MgO (using water and rotating brushes), then advantageously pickled in a bath with phosphoric acid, and immediately thereafter and directly downstream, said strip is fed to a continuous annealing line, where it is stress-relief annealed. As is known in practice, the moist, coated steel strip is usually suspended in a long loop in the intake region of a continuous annealing line. In this furnace region, the steel strip is heated with high heating power, in which process the insulating coating is also fully set and dried. Only then is the steel strip permitted to touch the first furnace transport roller. The annealing atmosphere that is used is non-critical, as is the heating speed, however, the maximum temperature that is reached must be between 840 and 880° C., and is ideally 860° C., in order to remove any mechanical stresses and to produce a steel strip that is evenly directed. If the temperature drops too far below this level, the desired effect will not be produced. If it is too far above this level, the insulating coating can sustain damage. However, it is particularly important for the cooling in which the steel strip is brought back to the ambient temperature to be as homogeneous as possible. This is usually achieved by using ventilators over a relatively long cooling pass.

In the outlet region of this last annealing line in the overall process of producing grain-oriented electrical steel strip, the finished product is delivered, and can be evaluated and certified on the basis of quality-relevant criteria.

The grain-oriented electrical steel strip that has been processed to form the final product can also be optionally subjected to a subsequent magnetic domain refinement, which can decrease the magnetization losses by an additional 12-20%. Such a device for domain refinement can be installed in the outlet part of the final insulation/stress-relief annealing system or can optionally be performed offline.

The procedure for one embodiment example is as follows:
A steel smelt having a chemical composition of
3.230 wt % Si
0.058 wt % C
0.168 wt % Mn
0.206 wt % Cu
0.003 wt % S
0.030 wt % Al (acid soluble)
0.088 wt % Sn
0.003 wt % N
0.087 wt % Cr
0.001 wt % Ti
0.029 wt % P
0.085 wt % Ni and small, unavoidable quantities of impurities is cast in a metal mold to a casting thickness of 85 mm using the thin slab continuous casting technique, and is formed by the "liquid core reduction" method (in thickness reduction according to the "liquid core reduction" method, the strand thickness is reduced just below the metal mold while the interior of the strand has a liquid core. Also possible is the so-called "soft reduction" method, in which a selective thickness reduction of the cast strand is (first) performed at the solidification point close to final solidification), without exposure of the strand to inert gas, to a strand having a thickness of 65 mm to 85 mm (the latter thickness being achieved without liquid core reduction) and a width of 1100 mm to 1250 mm.

Following a subsequent controlled cooling, the strand that is produced reaches a temperature behind the metallurgical length of 1190° C., at which the strand is bent from vertical to horizontal and is then divided crosswise into individual slabs. Thus the slabs are produced by means of the so-called thin slab technology. The slabs are then subjected to 20 minutes of homogenization annealing at 1150° C., which is finished by a high-temperature treatment. For that purpose the slabs are guided through an electrically powered continuous induction heating device, immediately prior to the first hot rolling pass, and are brought by said device to a temperature of 1370° C. at least for a short time of several seconds. The (thin) slabs then pass through a high-pressure descaling device followed by a hot-rolling treatment in form of a hot-rolling process in a rolling mill.

The first hot working pass is carried out approximately 10 s after leaving the inductor or the induction heating device, at a temperature of approximately 1280° C.

In the embodiment example, the thin slab is hot rolled to a hot strip in a hot-rolling train comprising 6 stands, wherein after leaving the last stand, each hot-rolled strip has a thickness of 2.30 mm.

Upon completion of hot-rolling treatment, the hot-rolled strip that is produced from the thin slab has a final rolling temperature of 930° C. It then passes, after approximately 5 s, through a laminar cooling path, before being wound at a reeling temperature of approximately 580° C. to a reel to form a coil.

The hot-rolled strip produced/generated in this manner will later be fed to a cold rolling process.

The cold rolling process begins with trimming the rough hot strip edges of the hot-rolled strip, after which it is fed to a continuous annealing process, by means of which it is annealed over a period of 220 s under non-oxidizing conditions (gas atmosphere with 95 vol. % dry $N_2$ and 5 vol. % $H_2$) at a maximum temperature of between 920° C. and 1150° C., in particular at a temperature of 950° C. or 1050° C. or 1120° C.

Immediately after the annealing process, within 5 seconds of leaving the furnace that was used for the annealing process, the annealed hot-rolled strip is subjected to a high-pressure water spraying and a cooling rate ranging from 28 K/s to 52 K/s, in particular, defined cooling rates of 52 K/s or 45 K/s or 38 K/s or 28 K/s.

The hot-rolled strip that has been annealed and quenched in this manner is then pickled, wherein the surface scales are broken up and are dissolved by pickling chemicals like hydrochloric acid.

The hot-rolled strip which is now prepared for cold rolling is then fed to a cold rolling process, in which it is cold rolled, in a reversible cold-rolling stand in a single process comprising multiple passes, to a nominal usable thickness ranging from 0.23 mm to 0.30 mm, in particular, to the standard nominal thickness of 0.23 mm or 0.27 mm or 0.30 mm. In this process, the strip temperature that results from the working heat is adjusted and controlled such that during the second to the last cold rolling pass, a temperature of 235° C., or a maximum of 260° C., is established, and the strip is exposed to this temperature for 10 minutes, but at least for 5 minutes.

The strip which has been cold rolled to its usable thickness is then subjected in a furnace to recrystallization, decarburization, then intermediate reduction, and finally nitridation continuous belt annealing treatment, the procedure for which is as follows:

The cold-rolled steel strip is first heated in the furnace at an average heating rate of 30 K/s to a holding temperature of 850° C. and is annealed for a maximum of 150 seconds at this temperature, wherein the gaseous annealing atmosphere in the furnace consists of a moist mixture of 60 vol. % $N_2$ and 40 vol. % $H_2$, at a saturation temperature of 54° C., so that a water vapor/hydrogen partial pressure ratio $pH_2O/pH_2=0.44$ is established.

In the embodiment example, following an annealing step under the aforementioned conditions in the same furnace lasting 95 seconds, the strip then reaches a separate zone in which the annealing gas or annealing atmosphere has the same composition, but a different saturation temperature of only 10 to 16° C., which corresponds to a water vapor/hydrogen partial pressure ratio $pH_2O/pH_2$ of 0.03 to 0.05. The temperature in this furnace zone is 880° C.

Once the strip has been exposed to these conditions for a period of 20 seconds, it reaches a third separate zone in the furnace, in which it is then annealed at a temperature of 910° C. for a period of 30 seconds, wherein the gaseous annealing atmosphere at this point in the furnace consists of a mixture of 30 vol. % $N_2$ and 70 vol. % $H_2$ with a saturation temperature of 26° C., so that a water vapor/hydrogen partial pressure ratio $pH_2O/pH_2$ of 0.05 is established. A quantity of 7 vol. % ammonia ($NH_3$) is added to the gaseous annealing atmosphere (annealing gas); however, this quantity is not admixed with the annealing gas already present. Instead, the previously cooled $NH_3$ is blown immediately and directly onto the surfaces of the strip via (special) tuyere stocks, which are located above and below the strip to be treated. The annealed cold-rolled strip then has a total nitrogen content of 320 ppm and a primary recrystallized grain having a circle equivalent mean size (diameter) of 24 μm.

A coating of an annealing separator (non-stick layer) consisting of MgO with additives of 5 wt % TiO2, 0.5 wt % Na2B4O7 and 0.05 wt % MgCl2 (quantities referred to the quantity of MgO) is then applied to the annealed cold-rolled strip which has been treated and prepared in this manner. Both the steel strip and the annealing separator in the form of an aqueous anti-adhesion slurry are cooled to 4° C. prior to coating. Immediately after the coating with the annealing separator (non-stick layer), the two opposing large-area steel strip surfaces (surface areas) are dried using intensive infrared radiation. The cold-rolled strip is then wound onto a reel to form a coil, tilted to a position in which the coil axis is vertical, and delivered in this position.

To obtain a grain-oriented electrical steel strip having a Goss texture for use in transformers, which is characterized by a particularly sharp {110}<001> texture (Miller indices) and which has a slight magnetization direction parallel to the rolling direction, a Goss texture is then formed in a secondary recrystallization process, for which purpose the coils are annealed in a high-temperature, bell-type annealing furnace, in which a heating rate of 20 K/h is established. The heating phase is interrupted by a holding stage at 650° C., during which the temperature is maintained for a period of 5 hours for the purpose of temperature compensation. Heating is then continued as before, until a temperature of 1200° C. is reached. Throughout this time, a dry gas consisting of 75 vol. % $N_2$ and 25 vol. % $H_2$ flows through the annealing hood. The temperature of 1200° C. represents the holding temperature at which, when reached, the gas atmosphere prevailing in the annealing hood is switched to 100% dry hydrogen. The coils are annealed for 24 hours at this high-temperature holding stage of 1200° C. This is followed by gradual cooling to the ambient temperature, in which, when the temperature drops below 600° C., the gas atmosphere in the annealing hood is switched to 100% $N_2$. During the heating phase, but preferably during the entire secondary recrystallization annealing process in the high-temperature bell-type annealing furnace, the quantity of Nitrogen ($N_2$), in terms of atomic percent, in the gaseous annealing atmosphere is greater than the quantity of hydrogen ($H_2$), in terms of atomic percent. Following this secondary recrystallization annealing, the grain-oriented electrical steel strip with Goss texture is finished.

Once the finished steel strip obtained in this manner has cooled to the ambient temperature, it is washed, pickled in phosphoric acid, coated with a liquid phosphating agent and finally continuously stress-relief annealed at a maximum temperature of 860° C. and then uniformly cooled.

The grain-oriented electrical steel strip produced in this manner has very good magnetic characteristics in the range of conventional HGO (High permeability Grain Oriented) material. The remagnetization loss at 50 Hz and 1.7 T modulation for such a steel strip having a finished steel strip nominal thickness/usable nominal thickness of 0.23 mm is 0.79 W/kg with a polarization of 1.93 T at a field strength of 800 A/m.

What is claimed is:

1. A process for producing grain-oriented electrical steel strip by means of thin slab continuous casting, comprising the following process steps:
    a) smelting a steel with a smelt which contains, in addition to iron (Fe) and unavoidable impurities:
    Si: 2.50-4.00 wt %,
    C: 0.030-0.100 wt %,
    Mn: 0.160-0.300 wt %,
    Cu: 0.100-0.300 wt %,
    Al: 0.020-0.040 wt %
    Sn: 0.050-0.150 wt %
    S: <100 ppm,
    N: <100 ppm,
    and one or more elements selected from the group consisting of Cr, V, Ni, Mo and Nb, wherein a ratio of manganese (Mn) to sulfur (S) is greater than 6, and a ratio of aluminum (Al) to nitrogen (N) is greater than 4;
    b) continuously thin slab casting the smelt, without exposure of a strand to inert gas, to form the strand having a thickness of 50-120 mm, and dividing the strand into thin slabs,
    c) carrying out a homogenization annealing comprising the step of heating the thin slabs to a temperature above 1050° C.,
    d) feeding the thin slabs through an induction heating device in which the thin slabs are immediately prior to a first hot-rolling pass are heated within several seconds up to a temperature above a homogenization temperature of process step c), wherein a temperature of the thin slab, immediately after exiting the induction heating device in process step is within a range of 1350°-1380° C.,
    e) continuously hot rolling the thin slabs in a linear, multiple-stand hot-rolling train to form a hot strip having a thickness of 1.8 mm-3.0 mm,
    f) cooling and reeling a hot-rolled strip at a reeling temperature of less than 650° C. to form a coil,
    g) annealing the hot-rolled strip, after reeling and prior to a subsequent cold rolling step, at a temperature of between 920° C. and 1150° C.,
    h) cold rolling the hot-rolled strip on a reversible stand, in a single process step in more than three passes, to a cold-rolled strip having a final thickness of 0.15 mm-0.40 mm, wherein during at least one or more of the final three passes, the hot-rolled strip reaches a temperature of at least 180° C. to a maximum of 260° C., resulting from processing heat produced during rolling, for a period of at least five minutes;
    i) subjecting the resulting cold-rolled strip to recrystallization, decarburization and nitridation annealing, wherein the recrystallization, decarburization and nitridation annealing of the cold-rolled strip comprises following one another
    a decarburization annealing phase which is carried out at a strip temperature ranging from 820° C.-890° C. for a maximum period of 150 seconds, with a moist nitrogen ($N_2$) and hydrogen ($H_2$)—containing annealing atmosphere which has a water vapor/hydrogen partial pressure ratio $pH_2O/pH_2$ of 0.30 to 0.60, an intermediate reduction annealing phase which is carried out between the decarburization and nitridation annealing phases and is carried out at a temperature ranging from 820° C.-890° C. for a maximum period of 40 seconds, with a dry annealing atmosphere which contains nitrogen ($N_2$) and hydrogen ($H_2$) which has a water vapor/hydrogen partial pressure ratio $pH_2O/pH_2$ of less than 0.10 and which comprises a resulting grain microstructure having an average primary recrystallized grain size having a circle equivalent mean size (diameter) between 22 μm and 25 μm, and a subsequent nitridation annealing phase which is carried out at a temperature ranging from 850° C.-920° C. for a maximum period of 50 seconds, with a nitrogen ($N_2$) and hydrogen ($H_2$)—containing annealing atmosphere which has a water vapor/hydrogen partial pressure ratio $pH_2O/pH_2$ of 0.03 to 0.07, and wherein at least 2 vol. % to a maximum of 12 vol. % ammonia ($NH_3$), referred to a total gas flow rate, is added separately to the annealing atmosphere, with the ammonia being blown onto both upper and lower strip surfaces of the cold-rolled strip, j) applying an annealing separator (non-stick layer) containing primarily MgO to a strip surface of the cold-rolled strip which has been recrystallization, decarburization and nitridation annealed, k) subjecting the cold-rolled strip which has been coated with the annealing separator to secondary recrystallization annealing in a bell-type furnace at a temperature of >1150° C., forming a finished steel strip having a Goss texture, l) coating a finished steel strip with an electrically insulating layer and thereafter, performing a stress-relief annealing of a coated steel strip.

2. The process according to claim 1, characterized in that, during the annealing in process step i), which comprises a decarburization annealing phase, an intermediate reduction annealing phase and a nitridation annealing phase, the cold-rolled strip is annealed such that after annealing, the cold-rolled strip has a total nitrogen content of at least 200 ppm.

3. The process according to claim 1, characterized in that, at the start of recrystallization annealing in process step i), the cold-rolled strip is heated at a heating rate of more than 100 K/s.

4. The process according to claim 1, characterized in that during casting in process step b), a temperature of the smelt during casting is less than 40 K.

5. The process according to claim 1, characterized in that the hot rolling in process step e) is carried out at an initial rolling temperature during a first working pass of greater than 1150° C., a final rolling temperature ranging between 850° C.-980° C., and a final rolling speed of less than 12 m/s.

6. The process according to claim 1, characterized in that, during annealing of the hot-rolled strip in process step g), an annealed hot-rolled strip is quenched after annealing at a cooling rate of more than 25 K/s.

7. The process according to claim 1, characterized in that the cold rolling in process step h) is carried out in two stages, wherein the hot-rolled strip is pickled in a pickling step prior to a first cold-rolling stage, and upon completion of the first cold-rolling stage, the rolled steel is annealed according to process step g) prior a second cold-rolling stage.

8. The process according to claim 1, characterized in that the secondary recrystallization annealing in process step k) is carried out such that, during a heating phase of the high-temperature annealing in a bell-type furnace, quantity of nitrogen ($N_2$) in a gaseous annealing atmosphere is greater than quantity of hydrogen ($H_2$).

9. The process according to claim 1, characterized in that, following process step 1), a process step that effects a magnetic domain refinement of the coated finished steel strip is carried out.

10. The process according to claim 7, characterized in that in the second cold-rolling stage, the thickness of the rolled strip is reduced by at least 85%.

\* \* \* \* \*

UNITED STATES PATENT AND TRADEMARK OFFICE
CERTIFICATE OF CORRECTION

PATENT NO. : 11,239,012 B2
APPLICATION NO. : 14/638338
DATED : February 1, 2022
INVENTOR(S) : Andreas Boettcher, Christian Klinkenberg and Ingo Schuster Page 1 of 1

It is certified that error appears in the above-identified patent and that said Letters Patent is hereby corrected as shown below:

In the Claims

Column 22, In Claim 4, insert --superheating-- before the term "temperature".

Signed and Sealed this
Twenty-sixth Day of July, 2022

Katherine Kelly Vidal
*Director of the United States Patent and Trademark Office*